(12) United States Patent
Kawaguchi et al.

(10) Patent No.: US 6,176,509 B1
(45) Date of Patent: Jan. 23, 2001

(54) AIR BAG DEVICE AND METHOD FOR ACCOMMODATING AN AIR BAG IN THE AIR BAG DEVICE

(75) Inventors: Teruhiko Kawaguchi; Itoshi Maeda, both of Aichi-ken (JP)

(73) Assignee: Kabushiki Kaisha Tokai-Rika-Denki-Seisakusho, Aichi-ken (JP)

( * ) Notice: Under 35 U.S.C. 154(b), the term of this patent shall be extended for 0 days.

(21) Appl. No.: 09/110,896

(22) Filed: Jul. 7, 1998

(30) Foreign Application Priority Data

Jul. 8, 1997 (JP) .................................................. 9-182762

(51) Int. Cl.[7] .................................................. B60R 21/16
(52) U.S. Cl. ...................... 280/728.1; 280/731; 280/732; 280/743.1
(58) Field of Search .............................. 280/728.1, 728.3

(56) References Cited

U.S. PATENT DOCUMENTS

| | | | |
|---|---|---|---|
| 5,178,407 | * | 1/1993 | Kelley .................................. 280/728 |
| 5,340,151 | * | 8/1994 | Sato ..................................... 280/743 |
| 5,520,408 | * | 5/1996 | Niederman ........................ 280/728.1 |
| 5,531,476 | * | 7/1996 | Kerner .............................. 280/743.1 |
| 5,547,218 | * | 8/1996 | Kuretake et al. ................. 280/743.1 |
| 5,564,730 | * | 10/1996 | Chizenko et al. ................. 280/728.1 |
| 5,605,350 | * | 2/1997 | Bates et al. ........................ 280/743.1 |
| 5,636,860 | * | 6/1997 | Fischer et al. ..................... 280/730.1 |
| 5,681,052 | * | 10/1997 | Ricks et al. ........................ 280/743.1 |
| 5,730,463 | * | 3/1998 | Fisher et al. ....................... 280/743.1 |
| 5,755,459 | * | 5/1998 | LaLonde ............................ 280/728.3 |
| 5,762,361 | * | 6/1998 | Herrmann et al. ................ 280/728.2 |
| 5,772,239 | * | 6/1998 | Seymour ............................ 280/728.3 |
| 5,794,971 | * | 8/1998 | Boydston et al. ................... 280/733 |
| 5,813,692 | * | 9/1998 | Faigle et al. ....................... 280/728.2 |
| 5,826,901 | * | 10/1998 | Automeit ........................... 280/728.2 |
| 5,865,466 | * | 2/1999 | Yamamoto et al. ............... 280/743.1 |
| 5,887,892 | * | 3/1999 | Burdack et al. ..................... 280/731 |
| 5,899,490 | * | 5/1999 | Wipasuramonton et al. .... 280/73.02 |

* cited by examiner

*Primary Examiner*—J. J. Swann
*Assistant Examiner*—L. Lum
(74) *Attorney, Agent, or Firm*—Nixon Peabody LLP; Thomas W. Cole

(57) ABSTRACT

An air bag device is structured in such a manner that an air bag can expand entirely and uniformly in a three-dimensional manner from the center thereof in the radial directions and in the forward direction of the air bag device all through the process in which the air bag inflates to unfold. The flat, unfolded air bag is folded from both ends thereof to form an elongated folding body, and the elongated folding body is folded from both longitudinal-directional ends thereof toward the side opposite to that where gas ejecting holes of the inflator are formed in such a manner as to wrap these ends inside, and a pair of roll-shaped folding bodies are thereby formed. Further, a preceding expanding and first folding portion provided to expand first is formed in a space between the pair of roll-shaped folding bodies.

9 Claims, 16 Drawing Sheets

AIR BAG DEVICE AND METHOD FOR ACCOMMODATING AN AIR BAG IN THE AIR BAG DEVICE

BACKGROUND OF THE INVENTION

1. Field of the Invention

The present invention relates to an air bag device which blows gas from an inflator into a folded air bag so as to inflate to unfold the air bag, and also to a method for accommodating the air bag in the air bag device.

2. Description of the Related Art

Recently in a vehicle, an air bag device is used which is mounted in a portion fixed to a vehicle body, for example, a steering wheel in an interior of the vehicle and which inflates to unfold an air bag due to a large acceleration being applied to the vehicle.

As the above-described air bag device, there is known, for example, the structure illustrated in FIGS. 19 to 21. In the air bag device 10 shown in these figures, an inflator 14 which is a gas generator is disposed at the center of a retainer 12 which is a supporting plate, and an air bag 18 is disposed to enclose gas ejecting holes 16 of the inflator 14 and is also covered with a module cover 20. In order that the air bag 18 thus disposed be provided in a narrow space formed between the inflator 14 and the module cover 20, the air bag 18 is accommodated compactly in a folded state.

Conventionally, as a method of folding the air bag 18, there is known a folding method which is called a so-called roll winding method. In this roll winding method, the air bag 18 of a circular flat surface in a developed state is, first, wound into a roll from both ends thereof in the diametrical direction to a front surface which faces a vehicle occupant in a state in which the air bag 18 inflates to unfold and where an aperture 18A into which the inflator 14 is inserted is not formed, so as to be folded up to become elongate (rectangular), thereby forming a first folding portion 24.

Next, the air bag 18 folded substantially into a rectangle is wound into a roll from both ends thereof to a rear surface, which is opposite to the front surface, with the aperture 18A formed thereon and a pair of roll portions 22 are thereby formed as post-folding portions.

The pair of roll portions 22 are each wound to the position near the aperture 18A and folded toward the front surface with no aperture 18A formed and in a direction opposite to the direction in which each roll portion 22 is wound, to form reversed portions 23. As a result, the folding method of roll winding type as shown in FIG. 19 is completed. In the roll winding system, the pair of roll portions 22 which are the post-folding portions are disposed adjacently so as to contact each other, and the first folding portion 24 which is a portion of the air bag 18 and folded preceding the pair of roll portions 22 is positioned between the pair of roll portions 22 and the inflator 14.

As shown in FIG. 19, in the air bag device in which the air bag 18 is accommodated in a state of being wound into rolls, when an acceleration sensor (not shown) detects a large acceleration of a predetermined value or more applied to the vehicle, the inflator 14 is actuated to generate gas. The gas generated in the inflator 14 blows out from the gas ejecting holes 16 to push to expand the first folding portion 24. As a result, as illustrated in FIG. 20, the pair of roll portions 22 are pushed by the expanded first folding portion 24 to break the module cover 20 along a groove-shaped break portion 26, and therefore, the pair of roll portions 22 are pushed out. Moreover, when the first folding portion 24 continues to expand by gas continuously ejected from the gas ejecting holes 16 of the inflator 14, the pair of roll portions 22 located at the front side in the direction in which the first folding portion 24 expands (i.e., the direction indicated by arrow A in FIG. 20) are pushed out by the first folding portion 24, and as a result, the pair of roll portions 22 moves rapidly toward the front side of the air bag device 10, i.e., in the direction indicated by arrow A and is thereby unfolded. Subsequent to this operation, when the air bag 18 is filled with gas ejected from the inflator 14, the air bag 18 inflates to unfold in the direction indicated by arrow B in FIG. 21 so as to be brought into a final expanding state having a slightly compressed spherical configuration.

Thereafter, the air bag 18 gradually becomes deflated in such a manner that gas is let out from an air hole.

In the above-described folding system in which the air bag 18 is wound into a roll, during an expanding operation of the air bag 18, the roll portions 22 which are the post-folding portions move toward the front side indicated by arrow A preceding the first folding portion 24 so as to expand toward the front side of the air bag device, and thereafter, as gas is fed from the first folding portion 24 of the air bag 18 to the roll portions 22, the roll portions 22 are each pulled back in a direction opposite to that indicated by arrow A (i.e., toward the rear side of the air bag device 10), and simultaneously, inflate to unfold in the directions indicated by arrows B (i.e., the left-and-right directions of the air bag device 10). As a result, the air bag is subjected to the expanding process so as to be brought into a final expanding state to have a compressed spherical configuration. For this reason, it is not possible that the entire air bag 18 expands uniformly through the expanding process in such a manner as to enlarge a ring of a concentric circle from the central portion thereof.

SUMMARY OF THE INVENTION

In view of the above-described circumstances, it is an object of the present invention to provide an improved air bag device which allows an entire air bag to expand uniformly in radial and forward directions of the air bag, i.e., in three-dimensional manner with respect to the center thereof, all through an expanding process of the air bag and also provide a method for accommodating the air bag in the air bag device.

According to the first aspect of the present invention, there is provided an air bag device which allows an air bag accommodated in a folded state to inflate to unfold due to gas ejected from an inflator, wherein: the air bag is accommodated in the air bag device in such a manner that the flat, unfolded air bag is folded up to form an elongated folding body; the elongated folding body is folded from both longitudinal-directional ends to wrap these ends inside a roll so as to form a pair of roll-shaped folding bodies; and a preceding expanding and first folding portion is formed in a portion of the previously-folded elongated folding body, which is a space between the pair of roll-shaped folding bodies, the preceding expanding and first folding portion being provided to start expanding first when gas is ejected from the inflator.

In an air bag device of the present invention, it is preferable that an aperture through which gas ejected from the inflator is introduced is formed at a central portion of the flat, unfolded air bag and the air bag may be folded from both sides with the aperture disposed as the center so as to form the elongated folding body and the pair of roll-shaped folding bodies.

Further, it is preferable that the transverse dimensions of each of the pair of roll-shaped folding bodies and the transverse dimensions of the preceding expanding and first folding portion in the longitudinal direction of the elongated folding body are substantially equal to each other. The transverse dimension of the preceding expanding and first folding portion may be substantially equal to the outer diameter of the inflator.

With the above-described structure, when the inflator starts to eject gas so as to inflate to unfold the air bag, the preceding expanding and first folding portion first starts to expand to come out in a space between the pair of roll-shaped folding bodies. Subsequently, when the precedingly expanding and first folding portion further inflates to unfold, the pair of roll-shaped folding bodies are caused to inflate to unfold toward both longitudinal-directional ends of the previously-folded elongated folding body. Accordingly, the air bag is allowed to expand entirely and uniformly in three-dimensional manner from the center thereof in the radial directions and in the forward direction of the air bag all through the process in which the air bag inflates to unfold.

In the present invention, in order to allow the air bag to expand more uniformly, it is preferable that the elongated folding body is formed in such a manner that the flat, unfolded air bag is folded up to wrap a portion of an outer peripheral edge of the air bag inside a roll, and/or the pair of roll-shaped folding bodies each comprise a roll portion, which is formed in such a manner that the elongated folding body is folded from a longitudinal-directional end to wrap the end inside a roll, and a reversed portion which is formed due to the roll portion being folded in a direction opposite to the direction in which the roll portion is wound.

In such case that the flat, unfolded air bag has a front surface which faces a vehicle occupant in a state in which the air bag inflates to unfold and a rear surface which is opposite to the front surface, the roll portion should be folded up toward the rear surface and the reversed portion should be folded up toward the front surface.

In the air bag device of the present invention, the air bag may be accommodated in a cover having a break portion which can be opened by gas ejected from the inflator. In such a case, it is preferable that the break portion is formed in the cover at a position which faces the preceding expanding and first folding portion.

According to the second aspect of the present invention, there is provided a method for accommodating an air bag in an air bag device which inflates to unfold the air bag due to gas ejected from an inflator, comprising the steps of: folding a flat unfolded air bag to form an elongated folding body; folding the elongated folding body from both longitudinal-directional ends to wrap these ends inside a roll so as to form a pair of roll-shaped folding bodies; and forming a preceding expanding and first folding portion in a portion of the previously-folded elongated folding body, which is a space between the pair of roll-shaped folding bodies, the preceding expanding and first folding portion being provided to start expanding first when gas is ejected from the inflator.

With this method according to the present invention thus structured, the air bag device according to the first aspect of the present invention can simply be obtained.

DESCRIPTION OF THE PREFERRED EMBODIMENTS

An air bag device according to a first embodiment of the present invention is shown in FIGS. 1 through 17. As shown in the cross-sectional view of FIG. 1, a retainer 32 of an air bag device 30 is formed from a plate material having a predetermined shape corresponding to a steering wheel or the like. An outer peripheral portion of the retainer 32 is bent at right angles to form a peripheral side surface 34 and a circular opening 36 is formed at the central portion of the retainer 32.

Figure 1:
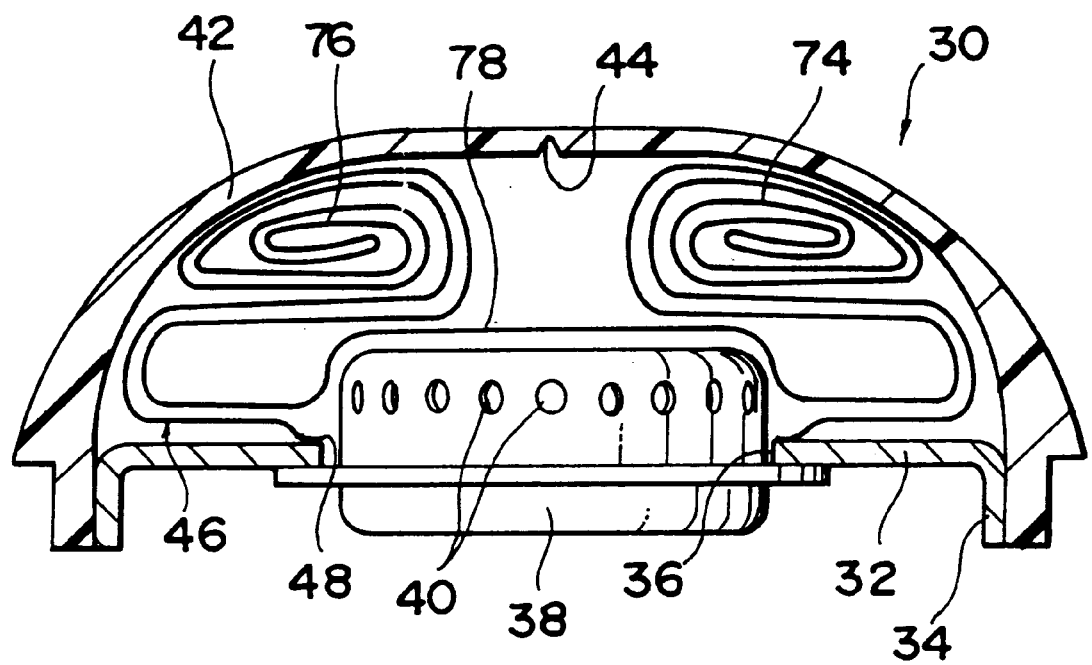
FIG. 1 is a cross-sectional view which schematically shows the state before an air bag of an air bag device according to a first embodiment of the present invention starts to expand.

An inflator 38 (which is comprised of any various inflators of gas generation type, gas cylinder type, and the like) is fixed integrally to the retainer 32 so as to close the opening 36. Further, a module cover 42 is mounted to the retainer 32 at the side where gas ejecting holes 40 of the inflator 38 (i.e., at the side of a driver) are formed in such a manner as to form and enclose a space in which an air bag is accommodated. The module cover 42 is made of synthetic resin and a portion thereof is formed to have a substantially U-shaped cross-sectional configuration as shown in FIG. 1. The module cover 42 is mounted to the retainer 32 in such a manner that an inner side surface portion at a free end of the module cover 42 abuts against an outer peripheral side surface of the peripheral side surface 34. A break portion 44 formed of a groove having a V-shaped cross sectional configuration and formed along a predetermined line pattern is provided in the inner side surface portion of the module cover 42 facing the retainer 32 so as to break and open the module cover 42 to allow an air bag 46 accommodated inside to unfold and inflate outward rapidly and satisfactorily.

The air bag 46 placed in an accommodation space enclosed by the retainer 32, the inflator 38, and the module cover 42 is accommodated so as to be folded up by a predetermined folding method in such a manner that a portion of the inflator 38 with gas ejecting holes 40 formed therein is inserted in an aperture 48 provided at the center of the air bag 46 and an overall circumferential edge portion of the aperture 48 is fixed along an overall circumference of the opening 36 of the retainer 32.

Figure 17:
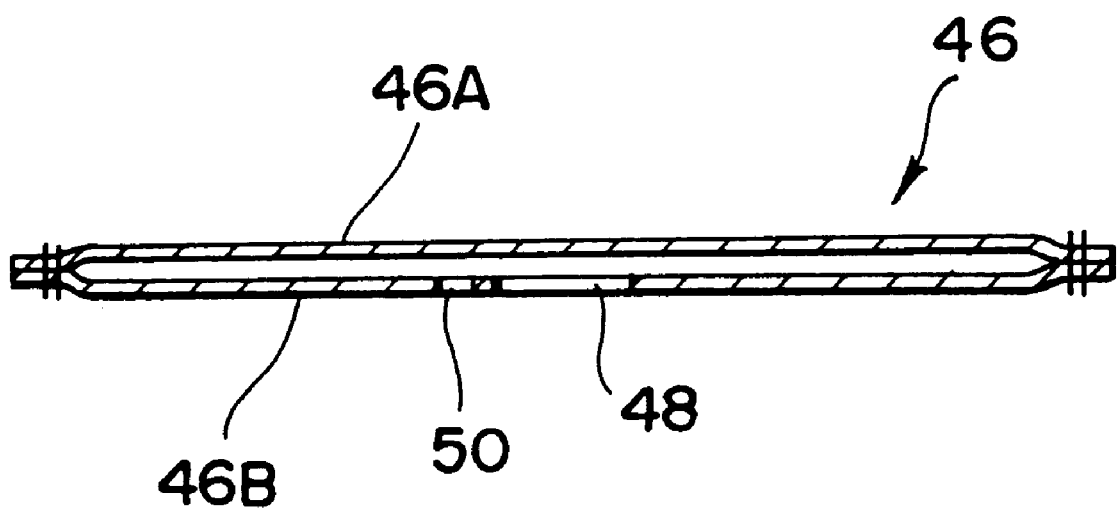
FIG. 17 is a cross-sectional view taken along x-axis in FIG. 4.

The air bag 46 is, as shown in FIG. 17, formed into a bag in such a manner that a cloth (front sheet) 46A which forms the front surface of the air bag, facing a vehicle occupant in a state in which the air bag 46 inflates to unfold, and a cloth (rear sheet) 46B which forms the rear surface disposed opposite to the front surface overlap each other and respective peripheral edge portions of the cloths 46A and 46B are sewn together by a sewing machine.

Figure 4:
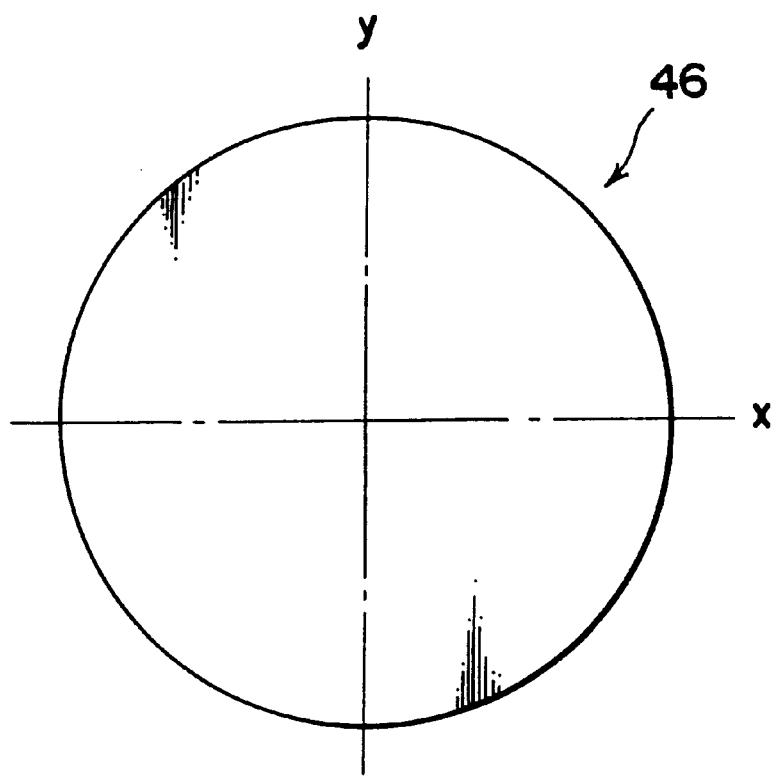
FIG. 4 is a front view which shows the air bag of the air bag device according to the first embodiment of the present invention in a state of being developed flat.

When the air bag 46 is in a state of being filled with no gas, as shown in FIG. 4, it is formed substantially in the shape of a flat circle. The aperture 48 in which the portion of the inflator 38 with the gas ejecting holes 40 formed therein is inserted is formed at the center of the cloth 46B (rear sheet). Further, the air bag 46 includes a vent hole 50 which lets gas out of the air bag 46 to achieve energy absorption during application of load to the air bag 46.

Next, a description will be given of a folding method of the air bag 46 to be accommodated in an air bag device with reference to FIGS. 4 to 16.

Figure 5:
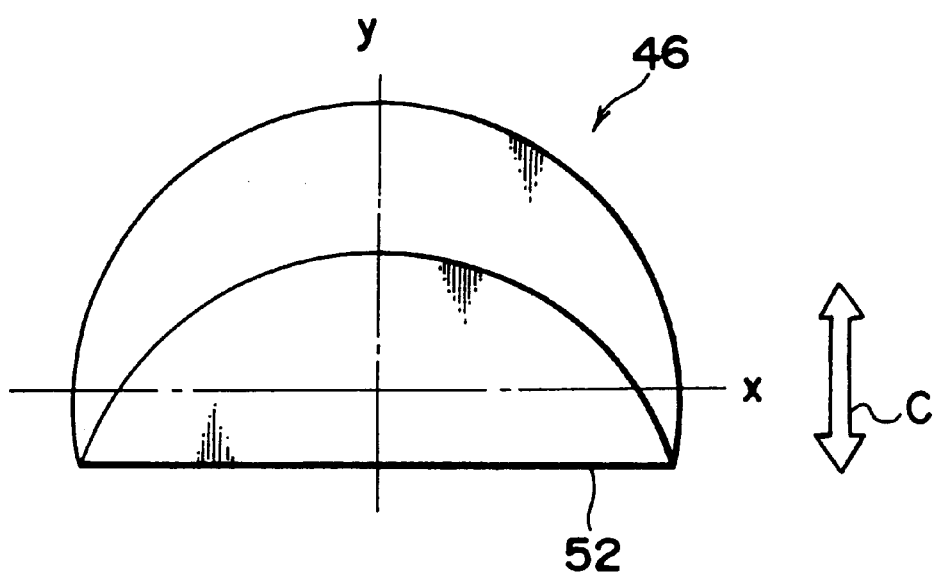
FIG. 5 is a front view which illustrates a folding method of a folding body of the air bag, in a state of being developed flat, in the air bag device according to the first embodiment of the present invention.
Figure 6:
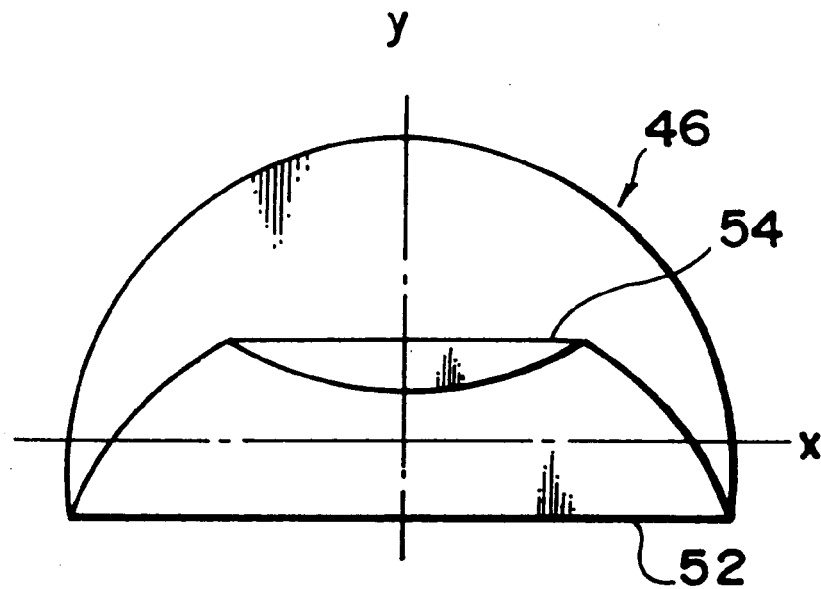
FIG. 6 is a front view which illustrates a folding method of a folding body of the air bag, in a state of being developed flat, in the air bag device according to the first embodiment of the present invention.
Figure 7:
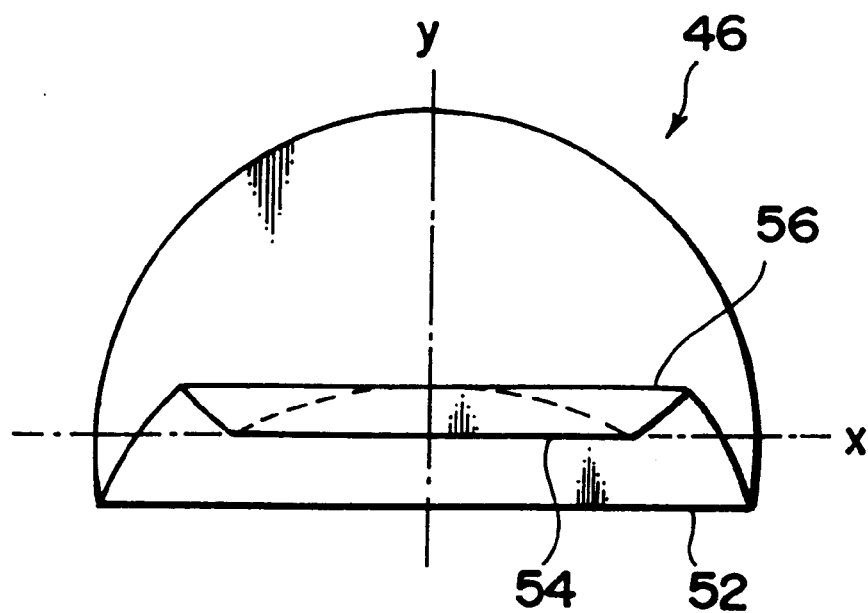
FIG. 7 is a front view which illustrates a folding method of a folding body of the air bag, in a state of being developed flat, in the air bag device according to the first embodiment of the present invention.
Figure 8:
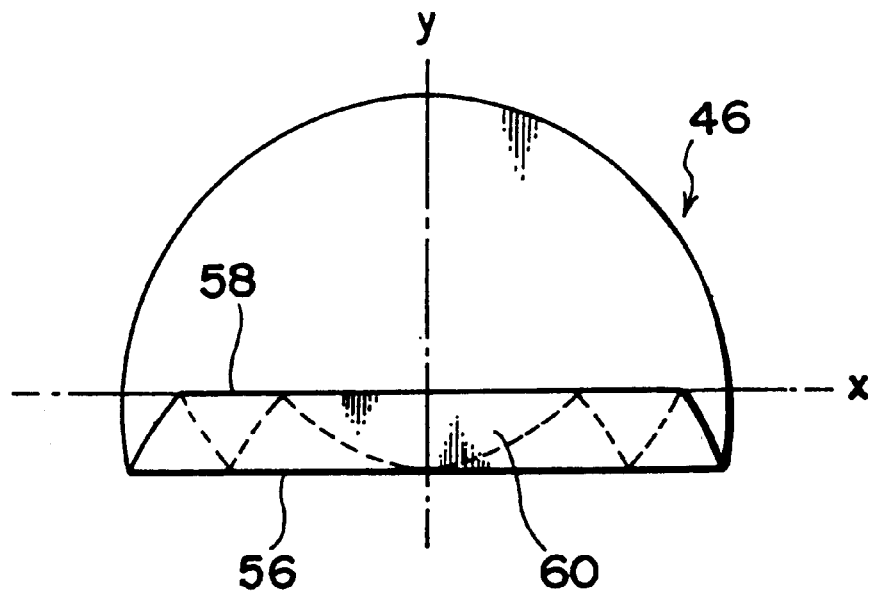
FIG. 8 is a front view which illustrates a folding method of a folding body of the air bag, in a state of being developed flat, in the air bag device according to the first embodiment of the present invention.

First, with the air bag 46 being placed in the state of being developed flat (see FIG. 4), as illustrated in FIG. 5, the lower half of the air bag 46 is folded up to the front surface along a turn-back line 52 parallel to an arbitrary center line x. Subsequently, as shown in FIG. 6, the end of the air bag 46 is folded up along a turn-back line 54 parallel to the center line x. Moreover, as shown in FIGS. 7 and 8, the lower half of the air bag 46 is folded up twice along turn-back lines 56 and 58 parallel to the center line x in such a manner that the end of the air bag 46 is wrapped inside. As a result, a folding body 60 at the lower half side of the air bag 46 is formed.

Figure 9:
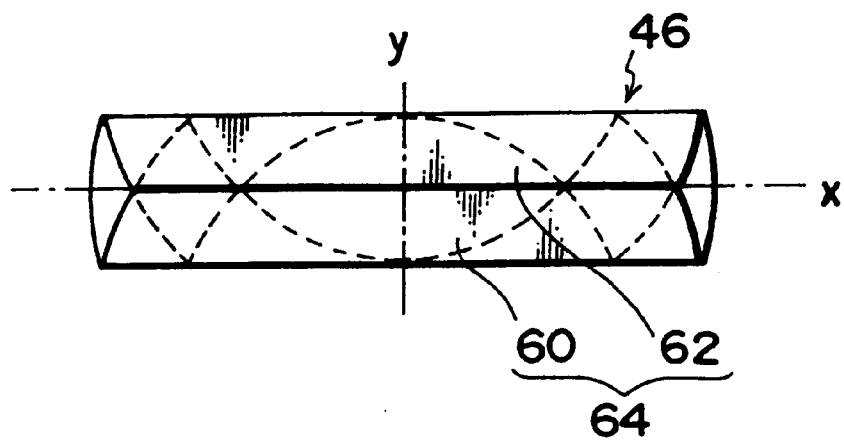
FIG. 9 is a front view which illustrates a folding method of a folding body of the air bag, in a state of being developed flat, in the air bag device according to the first embodiment of the present invention.
Figure 10:
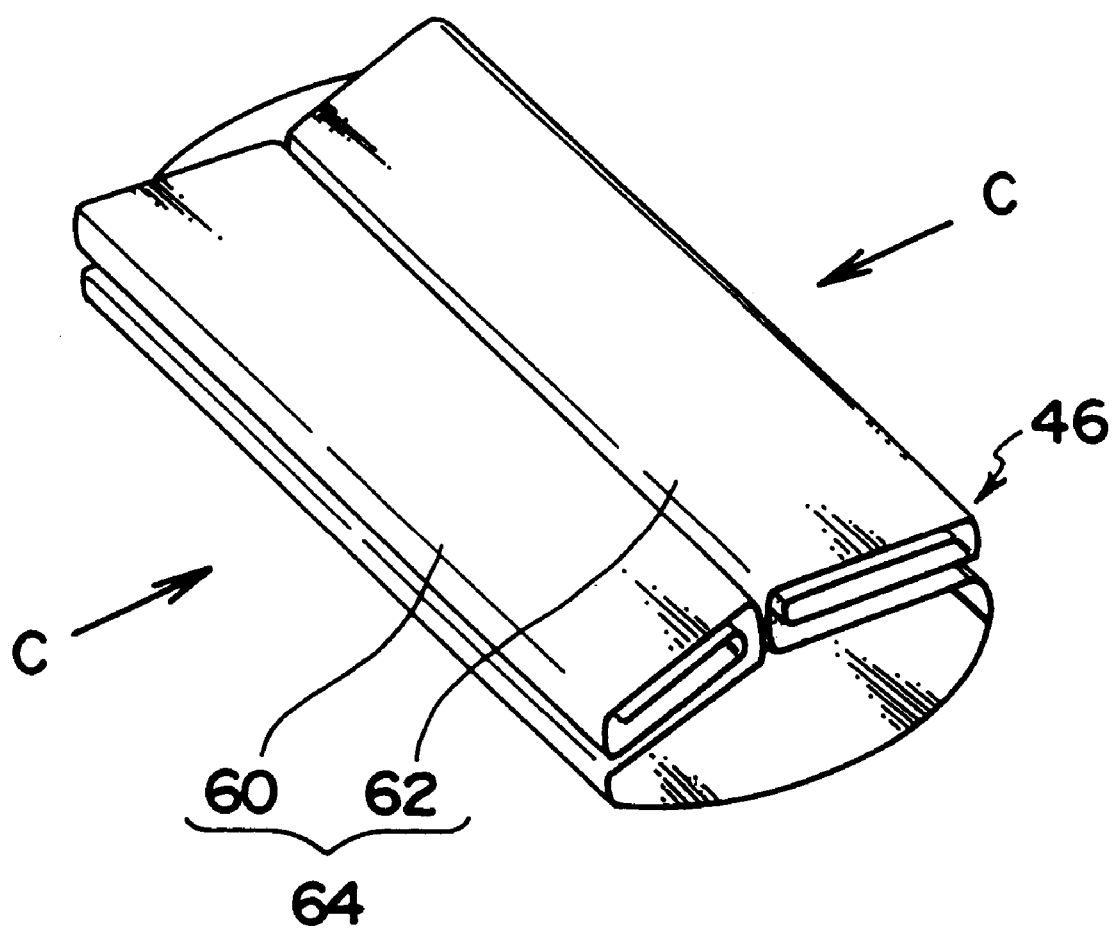
FIG. 10 is a perspective view which shows a folding body of the air bag in the air bag device according to the first embodiment of the present invention.

Next, as shown in FIG. 9, the upper half of the air bag 46 is folded up in the same manner as in the lower half and a folding body 62 at the upper half side of the air bag 46 is thereby formed.

The air bag 46 thus is folded up in the first direction indicated by arrow C in FIG. 5 so as to form an elongated rectangular folding body 64.

The above-described folding bodies 60 and 62 may each be formed by an arbitrary folding method. Further, the folding bodies 60 and 62 may be disposed close to or apart from each other.

Figure 11:
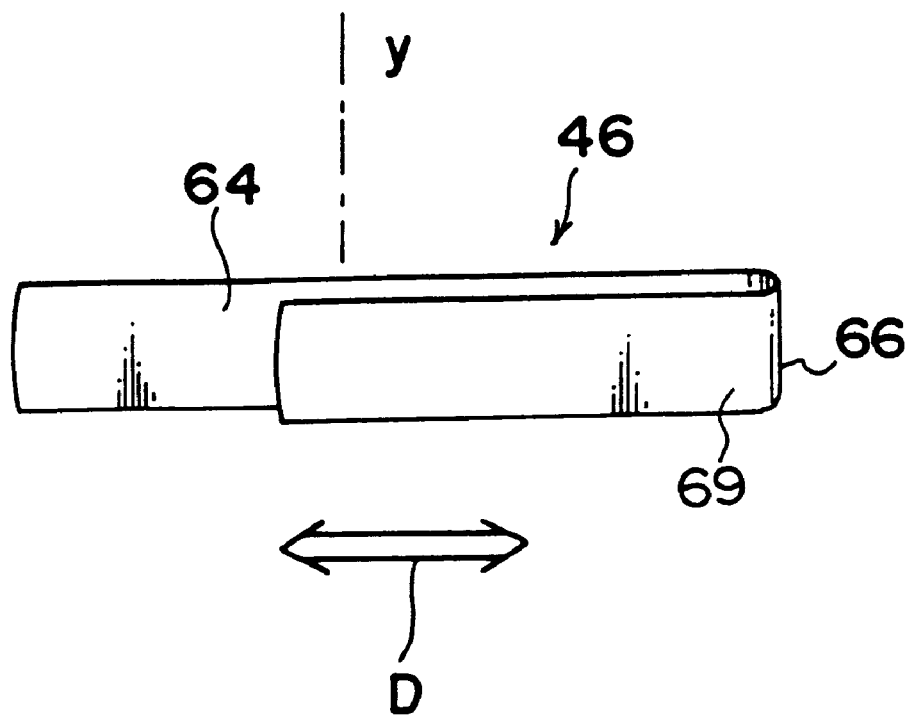
FIG. 11 is a perspective view which schematically shows a folding method of each of folding bodies further formed at left and right half sides of the first folding body of the air bag in the air bag device according to the first embodiment of the present invention.

Thereafter, as shown in FIG. 11, in order to form a post-folding portion, the right half of the elongated folding body 64 (on the paper of FIG. 11) is folded up to the front surface along a turn-back line 66 parallel to an arbitrary center line y to form a reversed portion 69.

Figure 12:
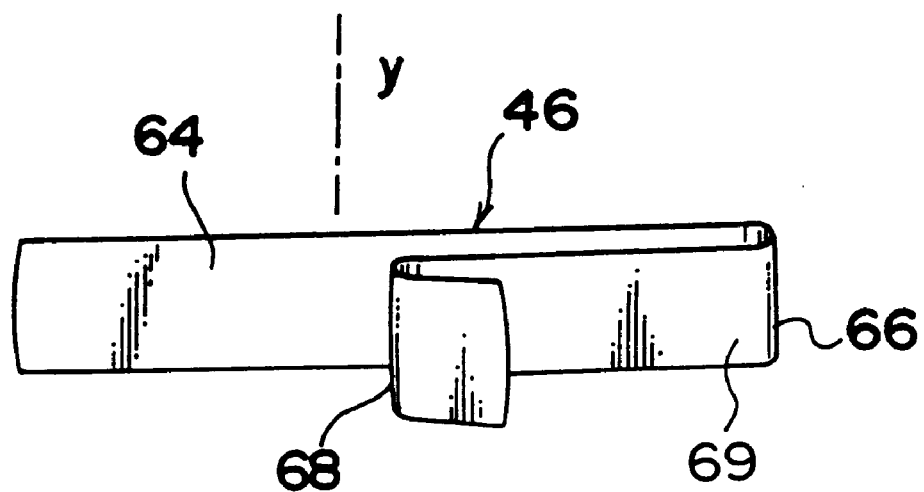
FIG. 12 is a perspective view which schematically shows a folding method of each of folding bodies further formed at left and right half sides of the first folding body of the air bag in the air bag device according to the first embodiment of the present invention.
Figure 13:
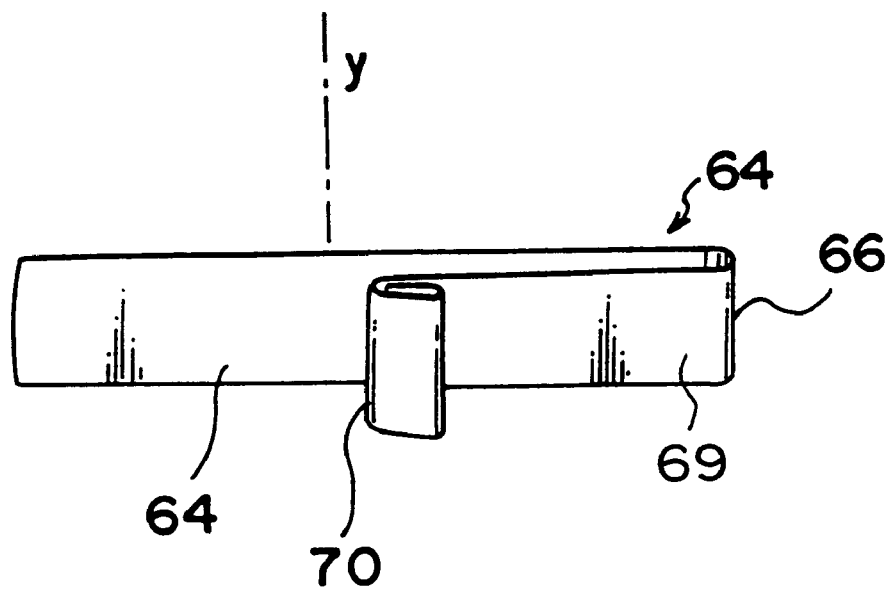
FIG. 13 is a perspective view which schematically shows a folding method of each of folding bodies further formed at left and right half sides of the first folding body of the air bag in the air bag device according to the first embodiment of the present invention.
Figure 14:
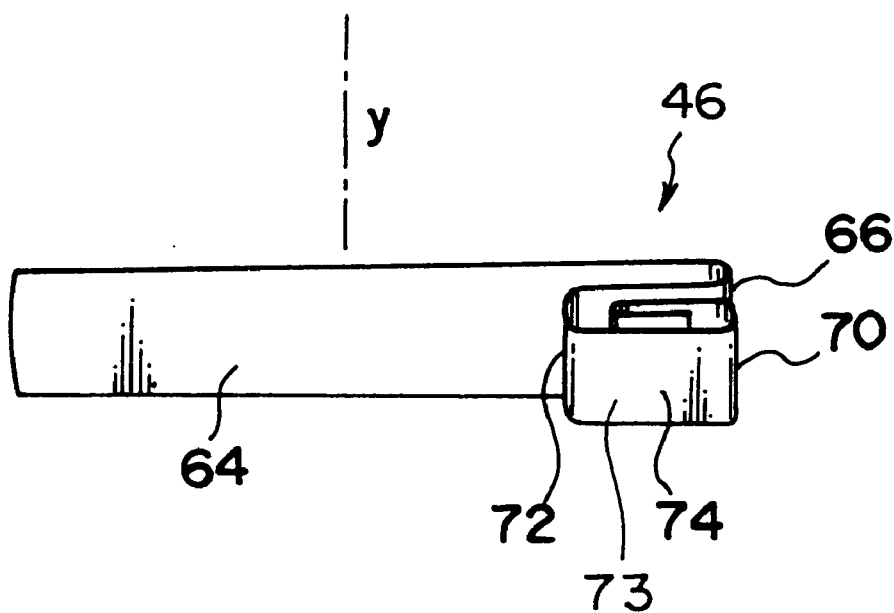
FIG. 14 is a perspective view which schematically shows a folding method of each of folding bodies further formed at left and right half sides of the first folding body of the air bag in the air bag device according to the first embodiment of the present invention.

Subsequently, as shown in FIG. 12, the longitudinal-directional end of the folded portion is folded up to the rear surface along a turn-back line 68. Further, as shown in FIGS. 13 and 14, the folded end portion is folded up twice along turn-back lines 70 and 72 in such a manner as to be wrapped inside to form a roll portion 73. As a result, a roll-shaped folding body 74 at the right half of the folding body 64 is formed.

The folding body 74 may be formed in such a manner that, first, the air bag 46 folded substantially into a rectangle is wound into a roll from the ends thereof to the rear surface with the aperture 48 formed thereon to form the roll portion 73 and the roll portion 73 is further folded toward the front surface with no aperture 48 formed and in a direction opposite to the direction in which the roll portion 73 is wound to form the reversed portion 69.

Figure 15:
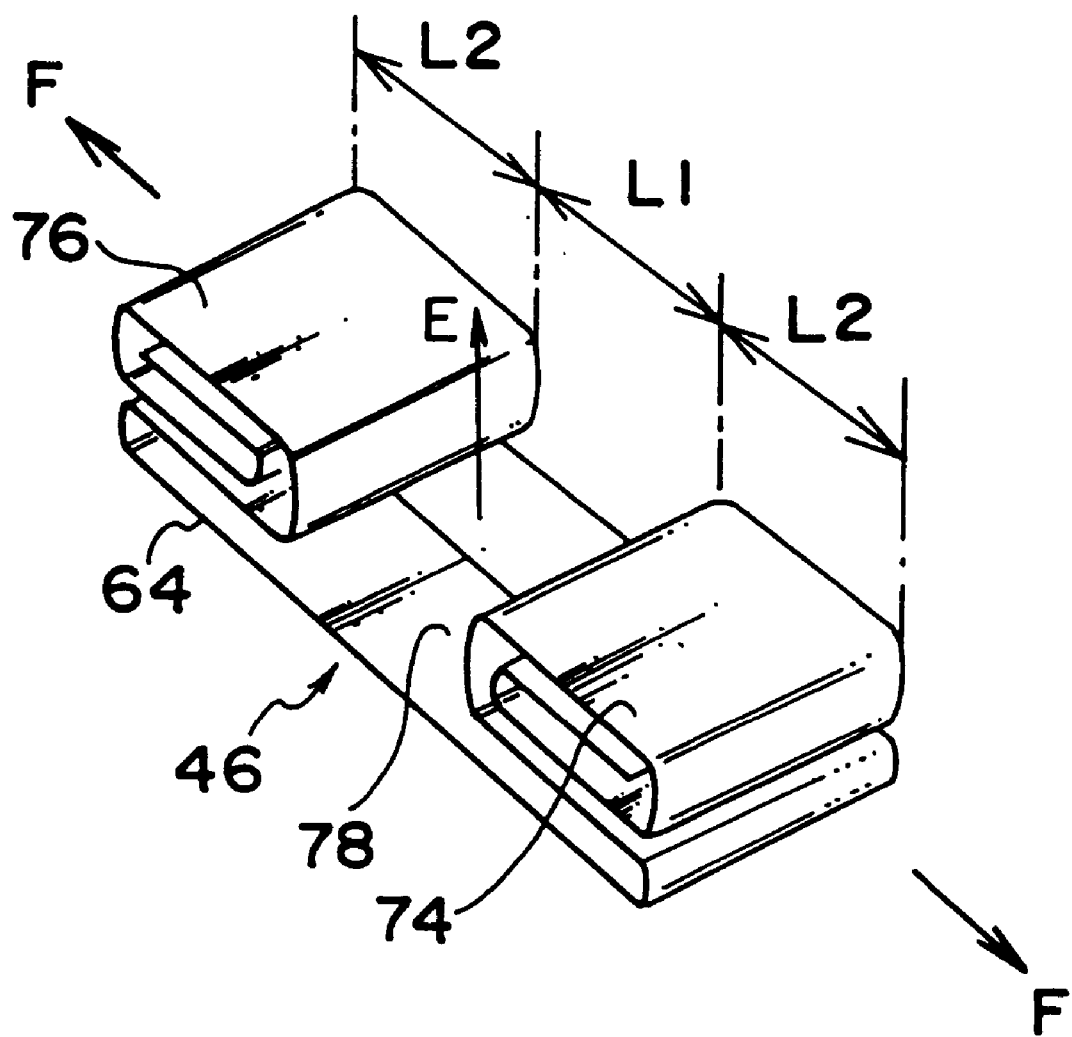
FIG. 15 is a perspective view which schematically shows the state in which folding of the air bag in the air bag device according to the first embodiment of the present invention is completed.
Figure 16:
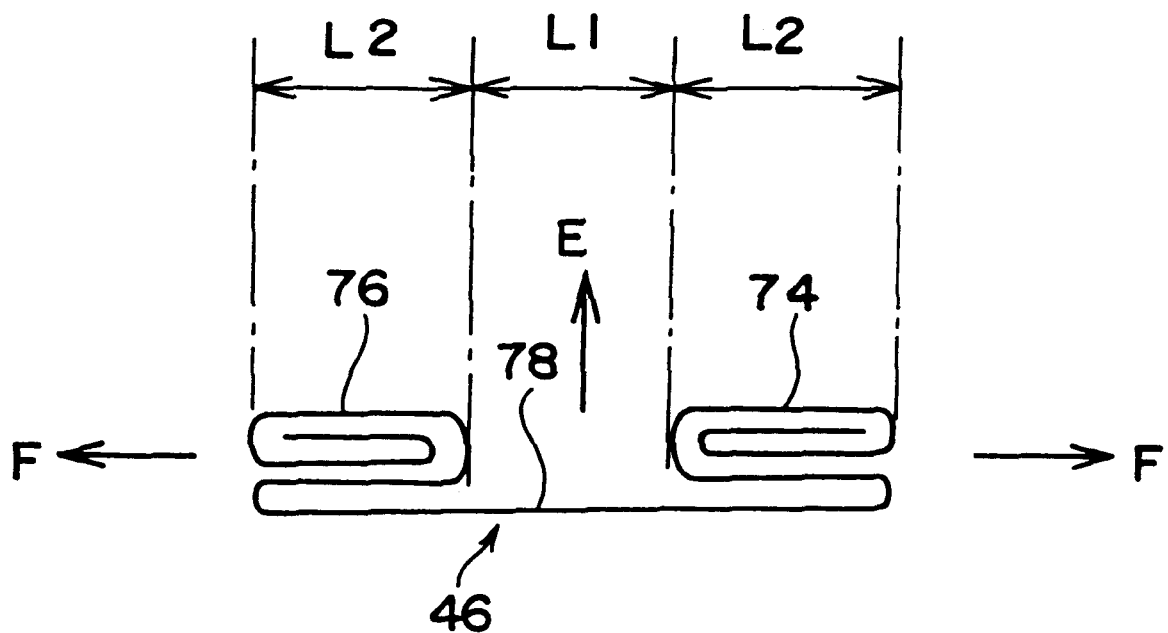
FIG. 16 is a side view which schematically shows the state in which folding of the air bag in the air bag device according to the first embodiment of the present invention is completed.

Thereafter, as shown in FIGS. 15 and 16, the left half side in the longitudinal direction of the air bag 46 is folded up to form the post-folding portion in the same manner as in FIGS. 11 to 15, thereby forming a roll-shaped folding body 76 at the left half side of the folding body 64.

In the state in which the air bag 46 is completely folded up (see FIGS. 15 and 16), a space having a width L1 is formed between the right-side folding body 74 and the left-side folding body 76. Namely, in the state in which the air bag 46 is completely folded up, a precedingly expanding and first folding portion 78 having the width L1 is set in the folding body 64 between the right-side and left-side folding bodies 74 and 76. The precedingly expanding and first folding portion 78 is shown as one line in each of the drawings, but is actually in the state in which an air bag sheet is folded in layered manner.

The precedingly expanding and first folding portion 78 is disposed at a position corresponding to the break portion 44 of the module cover 42. The precedingly expanding and first folding portion 78 is formed to have the width L1 which is set such that, during generation of gas from the inflator 38, the precedingly expanding and first folding portion 78 expands precedingly toward the front side (i.e., in the direction indicated by arrow E) with respect to the air bag device main body 30, and after breaking and opening of the module cover 42, the right-side and left-side folding bodies 74 and 76 of the precedingly expanding and first folding portion 78 are pushed out in radial directions perpendicular to the direction toward the front side with respect to the air bag device main body 30 (i.e., the transverse directions indicated by arrows F). Further, in the first embodiment of the present invention, the width L1 is set to be 50 mm and the ratio between the width L1, the width L2 of the right-side folding body 74, and the width L2 of the left-side folding body 76 is set such that 1:1:1.

The air bag 46 maintained in the folded state as shown in FIG. 1 is accommodated in the space formed between the inflator 38 integrated with the retainer 32 and the module cover 42 and is placed in a wait state until the time when the air bag expands to unfold comes.

Further, the inflator 38 mounted in the air bag device main body 30 is filled with a gas generating agent (not shown) and is provided with an igniter. Based on a signal generated by an acceleration sensor (not shown) detecting a large acceleration of a predetermined value or more applied to a vehicle, the igniter ignites the gas generating agent so as to rapidly generate gas.

Next, operation of the air bag device according to the first embodiment of the present invention having the above-described structure will be described.

The air bag device is mounted at a fixed portion such as a vehicle steering in the state shown in FIG. 1 and is placed in a wait state. When a large acceleration of a predetermined value or more is applied to the vehicle, the acceleration sensor detects this acceleration and generates a signal so that the inflator 38 allows the igniter to ignite the gas generating agent. As a result, gas is generated and is rapidly ejected from the gas ejecting holes.

The ejected gas expands the precedingly expanding and first folding portion 78 in the folded air bag 46 adjacent to the gas ejecting holes 40. As shown in FIG. 1, the precedingly expanding and first folding portion 78 faces the space formed between the two folding bodies 74 and 76, and therefore, as compared with other portions of the air bag 46 held by the retainer 32, the inflator 38, and the module cover 42, the precedingly expanding and first folding portion 78 can expand with no resistance.

Figure 2:
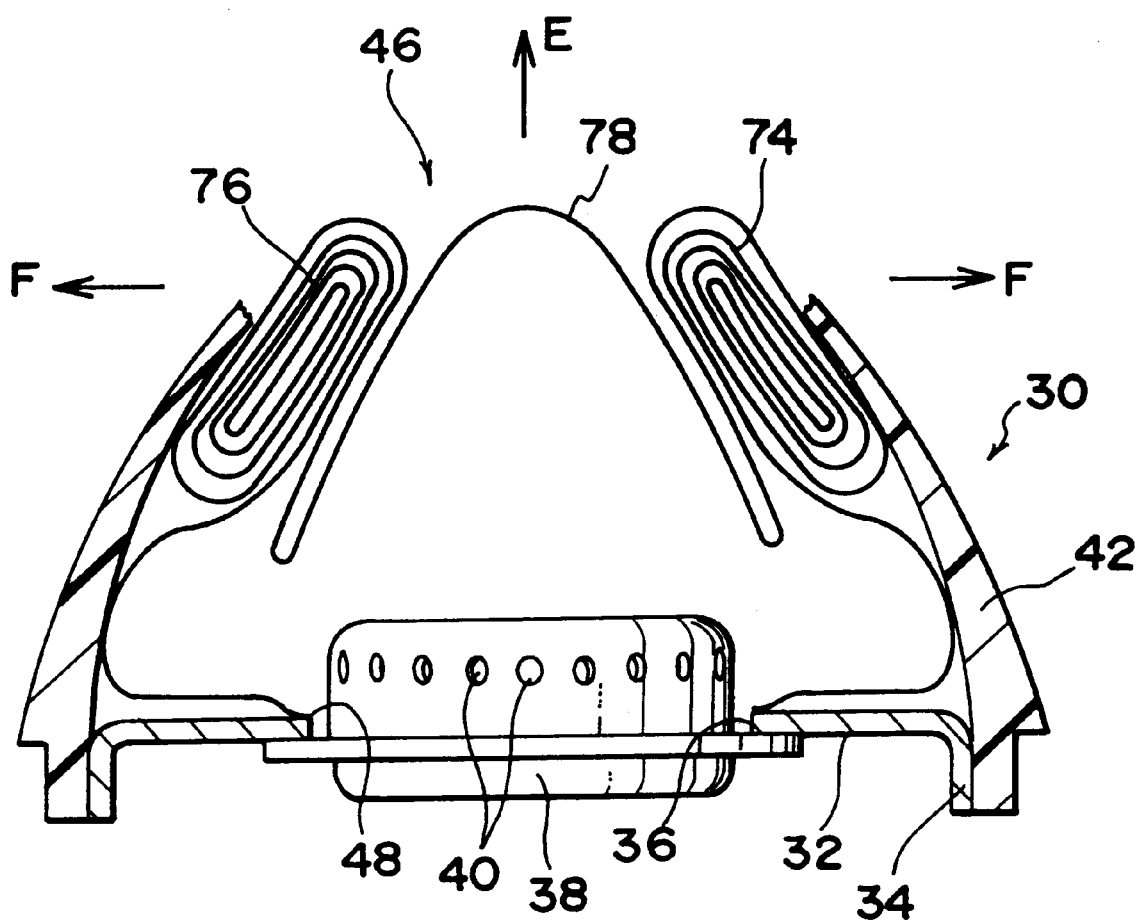
FIG. 2 is a cross-sectional view which schematically shows the state in which the air bag of the air bag device according to the first embodiment of the present invention starts to expand to break a module cover.

When the air bag 46 starts to expand into a full-filled state within the module cover 42, the module cover 42 is broken along the break portion 44 by the pressure of gas ejected from the inflator 38 so as to be pushed open as shown in FIG. 2.

In the state shown in FIG. 2, the precedingly expanding and first folding portion 78 of the air bag 46 expands to come out toward the front side of the air bag device 30 (i.e., in the direction indicated by arrow E) precedingly the other portion of the air bag 46, and the right-side folding body 74 and the left-side folding body 76 are thereby positioned at both sides of the raised expanding portion of the precedingly expanding and first folding portion 78.

Figure 3:
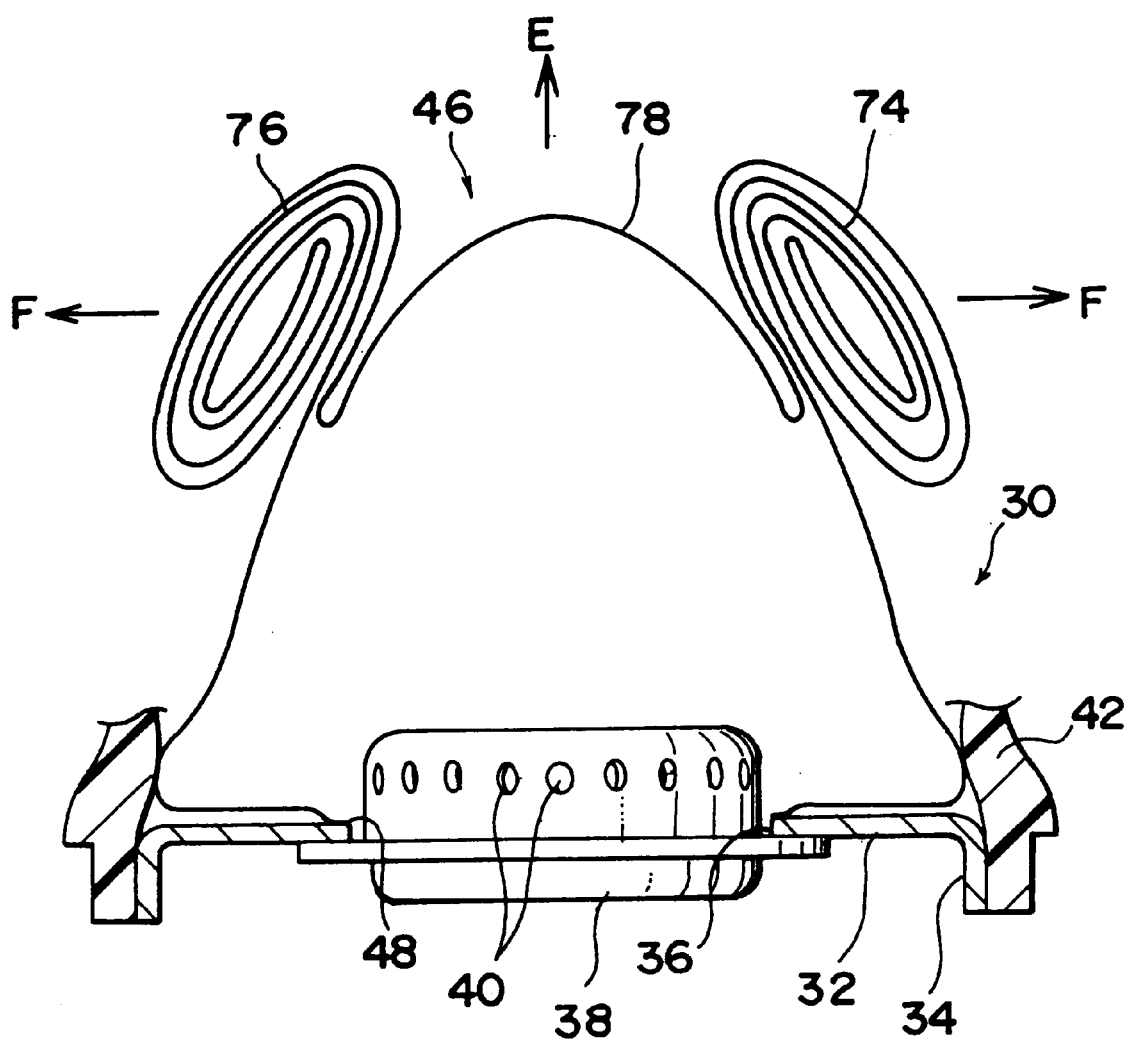
FIG. 3 is a cross-sectional view which schematically shows the state in which the air bag of the air bag device according to the first embodiment of the present invention inflates and comes out from the broken module cover to unfold outward.

When the air bag 46 expands further from the state shown in FIG. 2, the precedingly expanding and first folding portion 78 and the right-side and left-side folding bodies 74 and 76 each further expand in the direction indicated by arrow E and come out from a broken open portion of the module cover 42. When the precedingly expanding and first folding portion 78 and the folding bodies 74 and 76 are each brought into an opened state in which they does not contact by pressure the inner side surface of the module cover 42, as shown in FIG. 3, the precedingly expanding and first folding portion 78 expands in the radial directions at the front side of the air bag device main body 30 (i.e., the directions indicated by arrows F which is the transverse directions perpendicular to the direction indicated by arrow E). As a result, the right-side folding body 74 and the left-side folding body 76 each unfold up in such a manner as to be pushed apart from each other in the directions indicated by arrows F and the air bag 46 is filled with gas so as to entirely expand more uniformly in three-dimensional manner. Accordingly, the air bag 46 is brought into a final expanding and unfolding state having the shape of a compressed spherical bag in which a spherical body is crushed from the front side thereof (i.e., from the direction opposite to that indicated by arrow E).

As described above, the air bag 46 folded up in the first embodiment of the present invention can expand in such a manner as to simultaneously and uniformly unfold toward the front side (i.e., in the direction indicated by arrow E) and in the transverse directions of the air bag (i.e., the radial directions indicated by arrows F) with the inflator 38 set at the center, and therefore, the differences in the speed at which various portions of the air bag 46 expand toward a vehicle occupant can be lessened.

Figure 18:
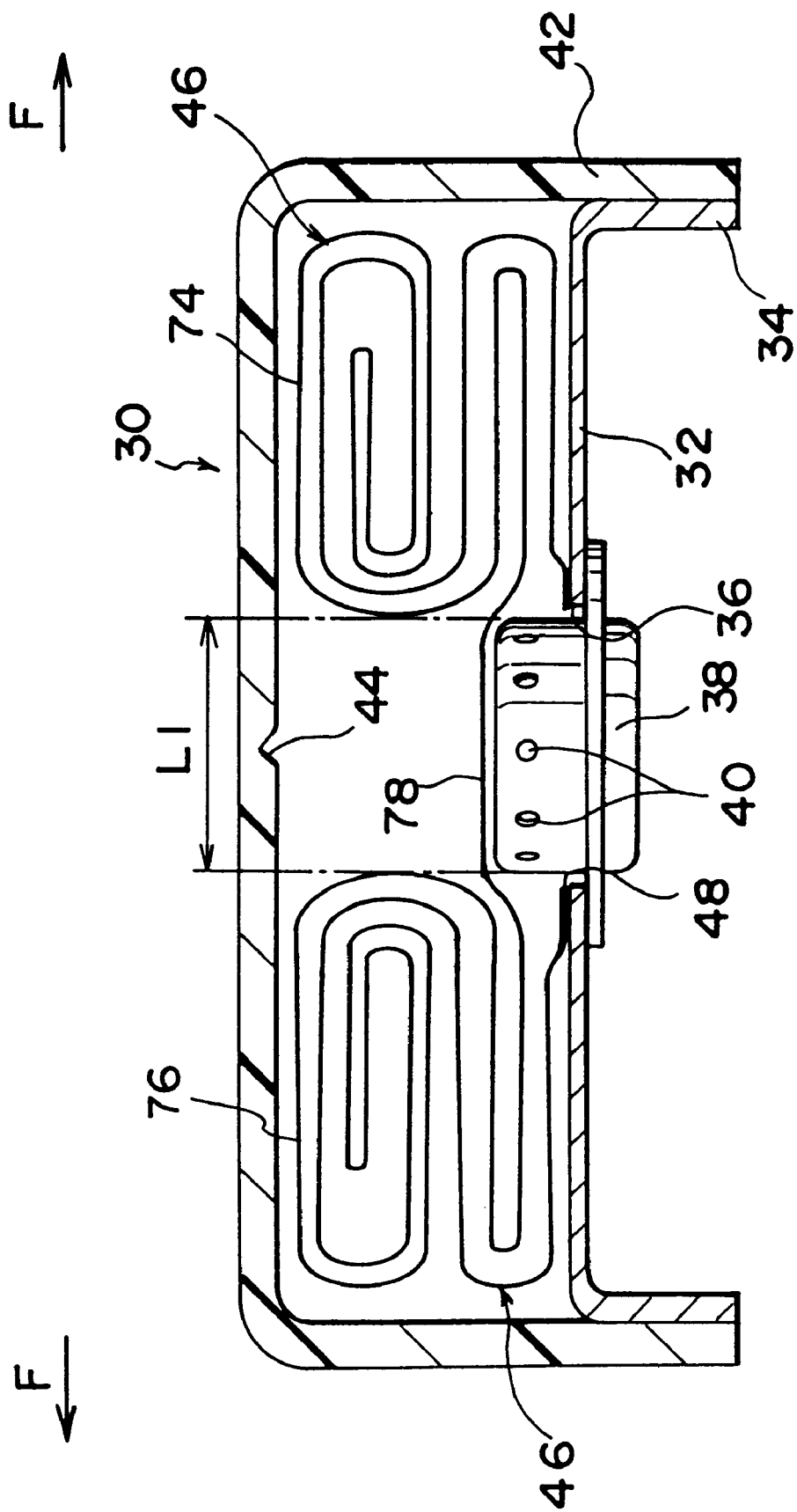
FIG. 18 is a cross-sectional view which schematically shows the state before an air bag device of an air bag device according to a second embodiment of the present invention starts to expand.
Figure 19:
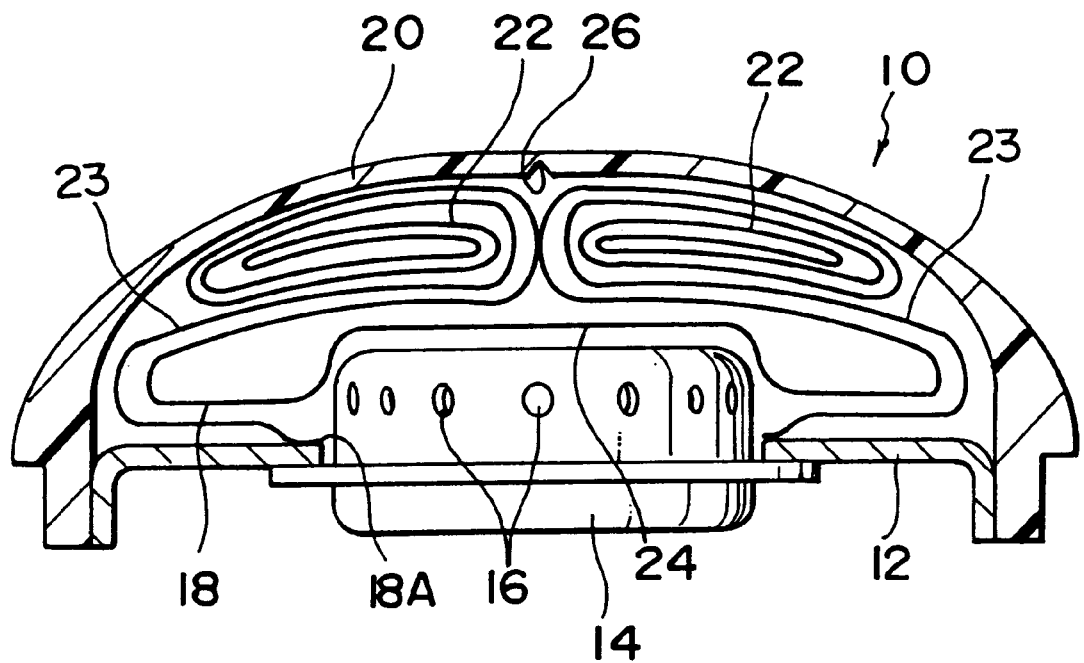
FIG. 19 is a cross-sectional view which schematically shows the state before an air bag of a conventional air bag device starts to expand.
Figure 20:
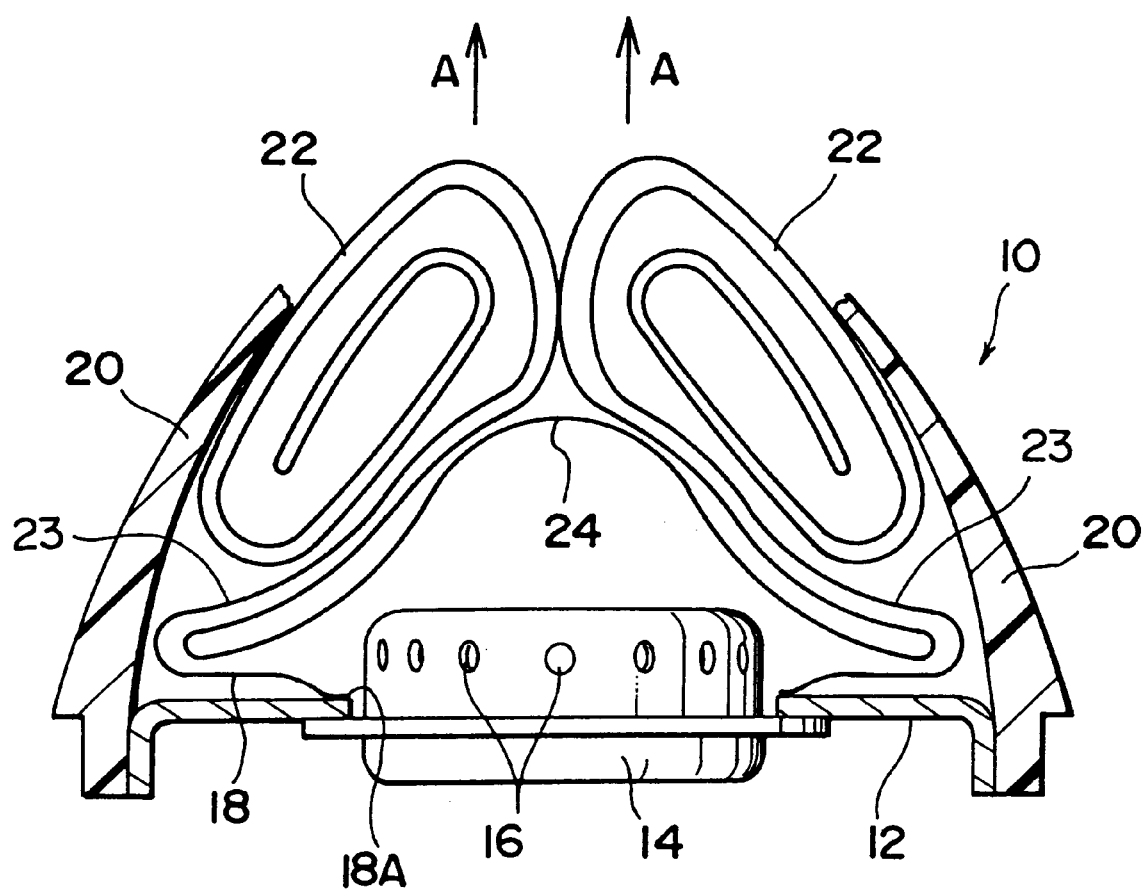
FIG. 20 is a cross-sectional view which schematically shows the conventional air bag device in the state corresponding to FIG. 2.
Figure 21:
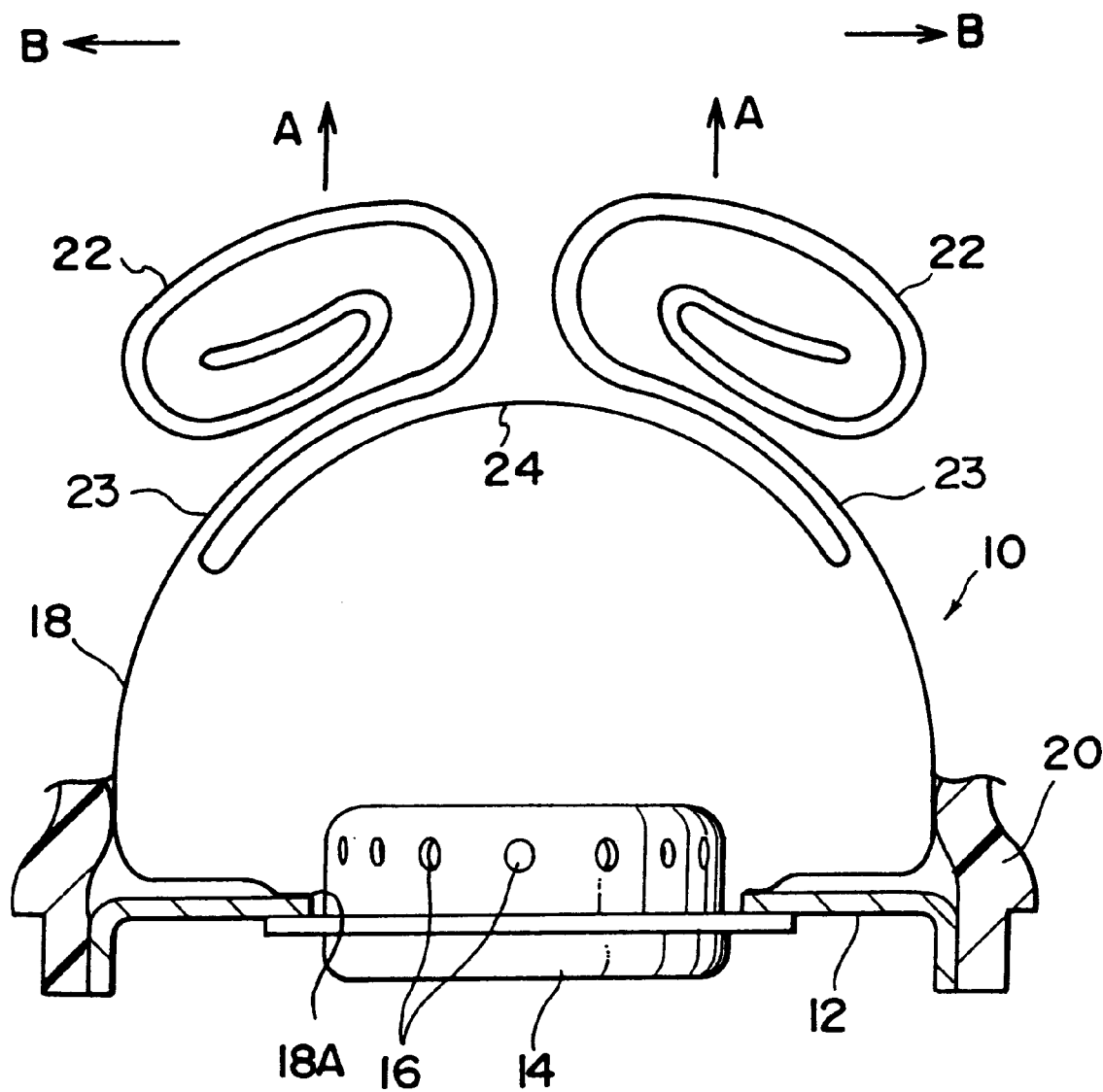
FIG. 21 is a cross-sectional view which schematically shows the conventional air bag device in the state corresponding to FIG. 3.

Next, a description will be given of an air bag device according to a second embodiment of the present invention with reference to FIG. 18. In the second embodiment, the setting width L1 of the precedingly expanding and first folding portion 78 is varied. Namely, the width L1 of the precedingly expanding and first folding portion 78 is set to be substantially equal to the outer diameter of the inflator 38. As a result, when the inflator 38 operates to generate gas, the precedingly expanding and first folding portion 78 corresponding to the entire front surface of the inflator 38 expands. Accordingly, after the module cover 42 is broken to be opened, the right-side and left-side folding bodies 74 and 76 are respectively positioned directly at both sides of the expanded precedingly expanding and first folding portion 78, and therefore, the right-side and left-side folding bodies 74 and 76 can be unfolded to expand more rapidly in the transverse directions (i.e., the radial directions indicated by arrows F).

Further, since the module cover 42 is formed to have a rectangular frame-shaped cross sectional configuration and the right-side and left-side folding bodies 74 and 76 can be accommodated compactly between the module cover 24 and the retainer 32. Thus, there is no possibility that these folding bodies 74 and 76 be each placed partially on the inflator 38.

The structure, operation, and effect other than those described above in the second embodiment are the same as those of the first embodiment, and a description thereof will be omitted.

The air bag device according to the present invention is not limited to each of the above-described embodiments, and it is to be understood that changes and variations may be made without departing from the spirit or scope of the invention. For example, the shape and structure of the air bag 46 can be arbitrarily altered.

As described above, the air bag device according to the present invention has an effect in that, all through the process in which an air bag inflates to unfold, the air bag is allowed to expand entirely and uniformly in three-dimensional manner from the center thereof in the radial directions and toward the side of a vehicle occupant.

What is claimed is:

1. An air bag device for installation in a vehicle and for protecting a vehicle occupant, which allows an air bag accommodated in a folded state to inflate to unfold due to gas ejected from an inflator, wherein: the air bag is accommodated in the air bag device in such a manner that the flat, unfolder air bag is folded to form an elongated folded body, the elongated folded body is roll-folded from both ends to wrap these ends inside a roll so as to form a pair of opposing roll-shaped folded bodies, the pair of roll-shaped folded bodies are disposed facing a vehicle occupant and the roll-shaped folded bodies are spaced apart from one another to form a space therebetween, the space extending in a direction generally orthogonal to a direction towards the vehicle occupant wherein a length dimension of each of the pair of roll-shaped folded bodies and the space between the pair of roll-shaped bodies are all equal to each other.

2. An air bag device according to claim 1, wherein an aperture through which gas ejected from the inflator is introduced is formed at a central portion of the air bag, the air bag being folded with the aperture disposed as the center of the elongated folded body, and centrally located between the pair of roll-shaped folded bodies.

3. An air bag device according to claim 1, wherein the inflator includes an outer diameter and the space has a length dimension extending between the pair of roll-shaped bodies and said length dimension is substantially equal to the outer diameter of the inflator.

4. An air bag device according to claim 1, wherein the air bag is initially flat and unfolded, and the elongated folded body is formed in such a manner that the flat and unfolded air bag is folded up to wrap a portion of an outer peripheral edge of the air bag inside a roll.

5. An air bag device according to claim 1, wherein the roll-shaped folded bodies each comprise a roll portion formed in such a manner that the elongated folded body is folded with a longitudinal edge of the elongated folded body wrapped inside a roll, and a reversed portion which is formed due to the roll portion being folded in a direction opposite to the direction in which the roll portion is wrapped.

6. An air bag device according to claim 5, wherein the air bag device is for installation in a vehicle, and the air bag has a front surface which, when the air bag is installed in a vehicle, faces a vehicle occupant in a state in which the air bag inflates to unfold and a rear surface which is opposite to the front surface, with the roll portion being wrapped toward the rear surface and the reversed portion being folded up toward the front surface.

7. An air bag device according to claim 1, wherein the air bag is accommodated in a cover having a break portion which can be opened when the air bag inflates.

8. An air bag device according to claim 7, wherein the break portion is formed in the cover at a position which substantially opposes the space between the pair of the roll-shaped bodies.

9. An air bag device for installation in a vehicle and for protecting a vehicle occupant, which allows an air bag accommodated in a folded state to inflate to unfold due to gas ejected from an inflator, wherein: the air bag is accommodated in the air bag device in such a manner that the flat, unfolded air bag is folded to form an elongated folded body, the elongated folded body is roll-folded from both ends to wrap these ends inside a roll so as to form a pair of opposing roll-shaped folded bodies, the pair of roll-shaped folded bodies are disposed facing a vehicle occupant and the roll-shaped folded bodies are spaced apart from one another to form a space therebetween, the space extending in a direction generally orthogonal to a direction towards the vehicle occupant wherein the inflator includes an outer diameter and the space has a length dimension extending between the pair of roll-shaped bodies and said length dimension is equal to the outer diameter of the inflator.

* * * * *